(12) United States Patent
Lopez et al.

(10) Patent No.: US 11,551,149 B2
(45) Date of Patent: Jan. 10, 2023

(54) SYSTEMS AND METHODS FOR CLASSIFYING SENSOR DATA

(71) Applicant: Inventus Holdings, LLC., Juno Beach, FL (US)

(72) Inventors: Hector K. Lopez, Jupiter, FL (US); Brian F. Heredia, Boynton Beach, FL (US); Jeroen Leverman, Fort Pierce, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 470 days.

(21) Appl. No.: 16/876,519

(22) Filed: May 18, 2020

(65) Prior Publication Data

US 2021/0357804 A1 Nov. 18, 2021

(51) Int. Cl.
  *G06N 20/00* (2019.01)
  *G06F 16/28* (2019.01)
  *G06N 5/02* (2006.01)

(52) U.S. Cl.
  CPC ........... *G06N 20/00* (2019.01); *G06F 16/285* (2019.01); *G06N 5/025* (2013.01)

(58) Field of Classification Search
  CPC ....... G06F 16/285; G06N 20/00; G06N 5/025
  See application file for complete search history.

(56) References Cited

U.S. PATENT DOCUMENTS

| 5,561,431 | A | 10/1996 | Peele et al. |
| 8,155,943 | B2 | 4/2012 | Nasle |
| 9,665,433 | B2 * | 5/2017 | Grewal ............... G06Q 10/087 |
| 9,980,205 | B2 * | 5/2018 | Meredith ............... H04W 4/02 |
| 9,985,863 | B2 * | 5/2018 | Fletcher ........... G06Q 10/06393 |
| 10,504,020 | B2 | 12/2019 | Trenholm et al. |
| 11,086,289 | B2 * | 8/2021 | Dean .................. G06F 16/9017 |
| 2003/0074207 | A1 * | 4/2003 | Pace ......................... G06F 8/60 709/204 |
| 2004/0024483 | A1 * | 2/2004 | Holcombe ............ G06Q 30/02 700/122 |
| 2008/0120129 | A1 * | 5/2008 | Seubert ............... G06Q 40/125 705/305 |
| 2008/0162209 | A1 * | 7/2008 | Gu ..................... G06Q 10/0637 |

(Continued)

OTHER PUBLICATIONS

Barahona, 2017, IEEE, sections I-V.*

(Continued)

*Primary Examiner* — Michael I Ezewoko
(74) *Attorney, Agent, or Firm* — Tarolli, Sundheim, Covell & Tummino LLP

(57) ABSTRACT

In some examples, sensor data comprising a first set and second set of sensor data can be received. The first set of sensor data can be provided to a rule-based classifier to identify a first normalized data tag. The second set of sensor data can be provided to a trained classifier to identify a second normalized data tag. The trained classifier can include a machine-learning model that has been trained based on tag sensor training data for classifying the second set of sensor data into a respective class associated with the second normalized data tag. The first and second sets of sensor data can be updated with respective first and second normalized data tags to normalize the first and second sets of sensor data to provide a standardized data label for each of the first and second sets of sensor data.

14 Claims, 5 Drawing Sheets

(56) References Cited

U.S. PATENT DOCUMENTS

| | | | | |
|---|---|---|---|---|
| 2012/0029720 | A1* | 2/2012 | Cherian | G06Q 10/06 700/297 |
| 2015/0185716 | A1* | 7/2015 | Wichmann | F02C 9/28 700/287 |
| 2016/0105338 | A1* | 4/2016 | Fletcher | G06F 3/0481 709/224 |
| 2017/0123397 | A1* | 5/2017 | Billi | G06F 3/0484 |
| 2017/0286838 | A1 | 10/2017 | Cipriani et al. | |

OTHER PUBLICATIONS

Hou, 2016, IEEE, pp. 880-884.*
Knijff, 2014, Elsevier, pp. 160-174.*
Linden, 2017, Elsevier, pp. 87-94.*
Trstanova, 2019 Elsevier, sections 1-5.*
Tchakoua, et al. "Wind Turbine Condition Monitoring: State-of-the-Art Review, New Trends, and Future Challenges", Energies 2014, 7, 2595-2630; doi:10.3390/en7042595, www.mdpi.com/journal/energies.
Maria Perez-Ortiz, et al. "A Review of Classification Problems and Algorithms in Renewable Energy Applications", Energies 2016, 9, 607; doi:10.3390/en9080607, www.mdpi.com/journal/energies.
Chen, et al. "Online 24-h solar power forecasting based on weather type classification using artificial neural network", SciVersse ScienceDirect, Solar Energy 85 (2011) 2856-2870.
Andreao, et al. "ECG Signal Analysis Through Hidden Markov Models", IEEE Transactions On Biomedical Engineering, vol. 53, No. 8, Aug. 2006.
Christodoulou, et al. "Unsupervided Pattern Recognition for the Classification of EMG Signals", IEEE Transactions on Biomedical Engineering, vol. 46, No. 2, Feb. 1999.
Guarracino, et al. "Supervised classification of distributed data streams for smart grids", Energy Syst (2012) 3:95-108, DOI 10.1007/s12667-012-0049-x.
Thabtah, "A review of associative classification mining" The Knowledge Engineering Review, vol. 22:1, 37-65. 2007, Cambridge University Press doi:10.1017/S0269888907001026 Printed in the United Kingdom.

* cited by examiner

| First Tag | Second Tag | Standardized Tag Classification |
|---|---|---|
| WBS1_001_WSpeed | WBS1-0001.Wind_Speed | Wind_Speed |
| WDB1_001_Wind_Speed | WDB1-0001.Wind_Speed | Wind_Speed |
| WAD1-0005.In_AnemometerWindSpd | WAD1-0005.Wind_Speed | Wind_Speed |
| WAD1-0006.In_WindSpd | WAD1-0006.Wind_Speed | Wind_Speed |
| WTG1.037.WindSpd-037 | WTG1-0037.Wind_Speed | Wind_Speed |
| WCZ1-0F03_Wind_Speed | WCZ1-0033.Wind_Speed | Wind_Speed |
| WEN2-0056_WindSpd | WEN1-0056.Wind_Speed | Wind_Speed |

FIG. 3

SYSTEMS AND METHODS FOR CLASSIFYING SENSOR DATA

TECHNICAL FIELD

The present disclosure relates to systems and methods for classifying sensor data to improve power generation site management and reduce onboard time of new power generation sites.

BACKGROUND

Power generation or electricity generation is the process of generating electric power from sources of primary energy such as heat (e.g., thermal), wind, solar, and chemical energy. Power generation sites are equipped with sensors to monitor for events or changes that may impact the electrical power generation. Each sensor is configured output sensor data. The outputted sensor data can be a physical signal (e.g., an analog electrical signal) and can provide a measure of continuous change with respect to the physical variable being measured. In other examples, the outputted sensor can provide a measure of discrete change with the physical variable. The output data can be used to provide information or input to a system or to guide a respective power generation process.

SUMMARY

One example relates to a non-transitory machine-readable medium having machine-readable instructions. The machine-readable instructions in response to be executed by a processor can cause the processor to receive sensor data that can include a first set of sensor data and a second set of sensor data. The machine-readable instructions can further cause the processor to provide the first set of sensor data to a rule-based classifier to identify a first normalized data tag for the first set of sensor data. The rule-based classifier can include at least one rule that can identify an associated data tag for corresponding sensor data. The machine-readable instructions can further cause the processor to provide the second set of sensor data to a trained classifier to identify a second normalized data tag for the second set of sensor data. The trained classifier can include a machine-learning (ML) model that has been trained based on tag sensor training data for classifying the second set of sensor data into a respective class associated with the second normalized data tag. The machine-readable instructions can further cause the processor to update the first and second sets of sensor data with respective first and second normalized data tags to normalize the first and second sets of sensor data to provide a standardized data label for each of the first and second sets of sensor data.

Another example relates to system that includes a non-transitory computer-readable medium configured to store tagged and untagged sensor data and machine-readable instructions. The tagged sensor data can include a data tag identifying a type of data of the tagged sensor data. The system employs a processor that can be configured to access the non-transitory computer-readable medium and execute the machine-readable instructions. The machine-readable instruction can include a rule-based classifier that can be programmed to identify a first normalized data tag for the tagged sensor data based on a pre-defined tag rule-set. The pre-defined tag rule-set can include at least one rule that identifies an associated data tag for corresponding sensor data. The rule-based classifier can be further programmed to update the tagged sensor data to include the first normalized data tag to provide a standardized data label for the tagged sensor data. The machine-readable instruction can further include a trained classifier that can include a ML model that can be programmed to classify the untagged sensor data to identify a given class associated with a second normalized data tag. The trained classifier can be further programmed to update the untagged sensor data with the second normalized data tag based on the classification by the ML model to provide the standardized data label for the untagged sensor data. The first and second normalized data tags can be one of similar normalized data tags and different normalized data tags.

Yet another example relates to a method that includes receiving a first and second sets of tagged sensor data. The first set of tagged sensor data can include a first data tag and at least one sensor value generated by a first sensor employed at a power generation site. The power generation site can include one of a power plant, a wind-turbine, and a solar panel. The second set of tagged sensor data can include a second data tag and at least one sensor value generated by a second sensor employed at the power generation site. The method can further include classifying one of the first and second sets of tagged sensor data using a rule-based classifier to identify a first normalized data tag. The rule-based classifier can include at least one rule that identifies an associated data tag for corresponding sensor data. The method can further include classifying using a ML model a remaining set of tagged sensor data not classified by the rule-based classifier to identify a given class of a plurality of classes associated with a second normalized data tag for the remaining set of tagged sensor data. The ML model can be trained based on tag sensor training data. The tag sensor training data can characterize at least one of a plurality of different data tags for respective sensor data and an associated normalized data tag for the respective sensor data, a numeric range for at least one sensor value characterized by the respective sensor data and the associated normalized data tag, a seasonality of the respective sensor data and the associated normalized data tag, and at least one waveform of an associated sensor signal provided by a corresponding sensor and the associated normalized data tag for the at least one waveform. The method can further include updating the first and second data tags for each of the first and second sets of tagged sensor data to respective first and second normalized data tags to provide a standardized data label for each of the first and second sets of tagged sensor data. The first and second normalized data tags can be similar normalized data tags.

BRIEF DESCRIPTION OF THE DRAWINGS

FIG. 3 illustrates an example of a table illustrating mapping of labeled sensor data to a standardized label.

DETAILED DESCRIPTION

Figure 1:
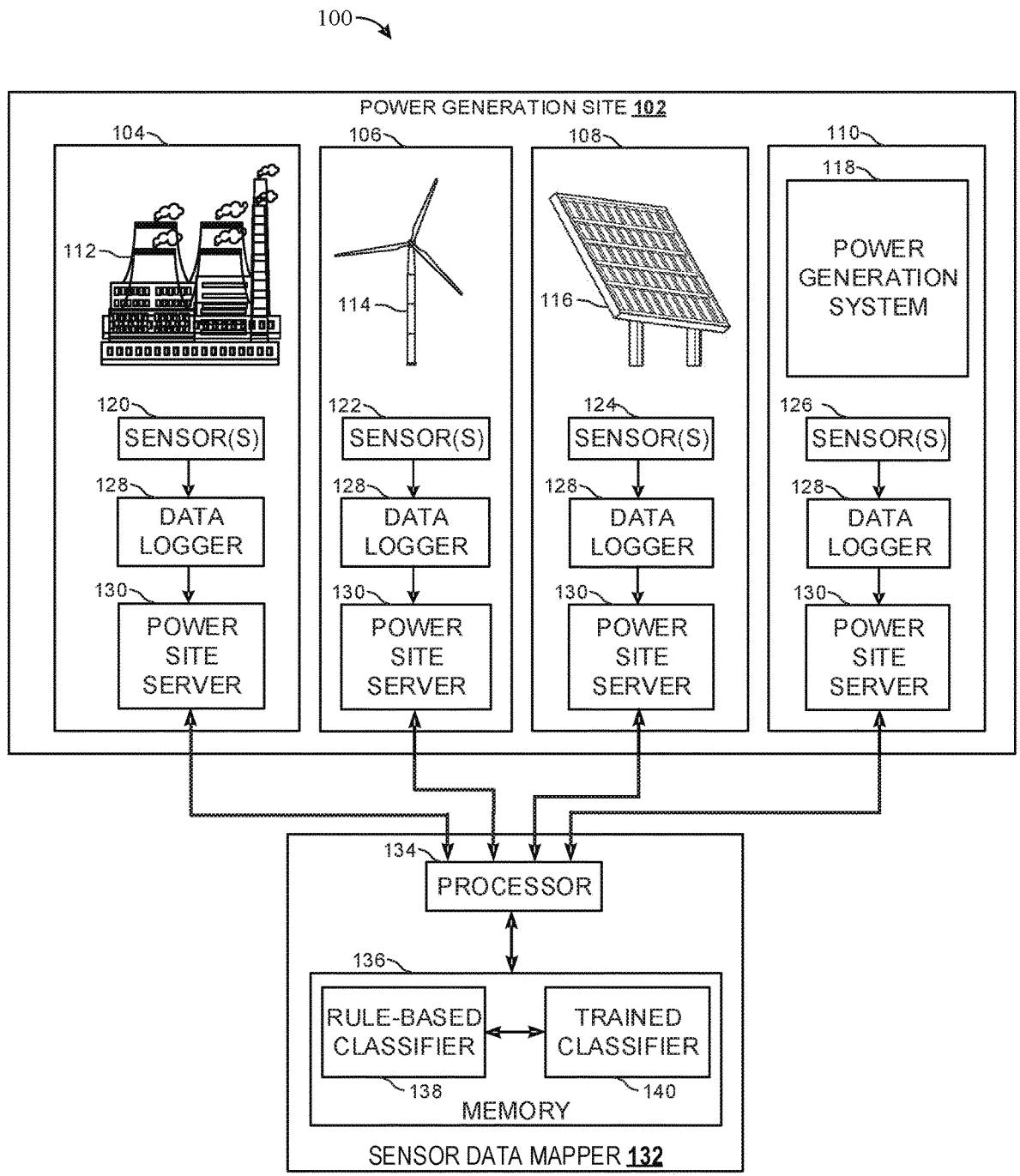
FIG. 1 illustrates an example environment for classifying sensor data.

This disclosure relates to classifying sensor data. Power generation sites are configured with sensors to monitor a given condition or property. In some instances, each sensor can be produced by a different manufacturer that may utilize a respective tagging standard for labeling (e.g., identifying) sensor data produced by the sensors. Due to variations among manufacturers in how the sensor data is identified, on-boarding of power generation sites can become complicated, such that a user (e.g., an operator) during an on-boarding process of a respective site may not be able to readily identify a type of sensor data from a corresponding sensors. In some instances, the sensor data may not include any labelling or tag information for the sensor data, which further complicates the on-boarding process for the user. In even further situations, the labelling or tagging information for the sensor data can be in a language different than that can be understood by the user.

In some examples, according to the systems and methods described herein, a sensor data mapper can be employed to normalize sensor data by providing a standardized data label for the sensor data, such that the user can with ease identify the type of sensor data, and, in some examples, and a source of the sensor data. The normalization of the sensor data can include updating (e.g., replacing, renaming, embedding, etc.) a data tag identifying a type of the sensor data, such that the sensor data can be recognized by the user regardless of the manufacturer of sensor. Thus, the sensor data mapper can reduce and improve on-boarding of new power generation sites by automatically identifying and assigning a normalized data tag for sensor data from new power generation site.

The sensor data mapper can be configured to communicate with a server and/or data logger at the power generation site to receive each instance of the sensor data. The sensor data mapper can be configured to provide the sensor data to one of a rule-based classifier and a trained classifier for classification of the sensor data. In some examples, the sensor data includes a first set of sensor data corresponding to tagged sensor data and a second set of sensor data corresponding to untagged sensor data. The rule-based classifier can be programmed to process the tagged sensor data and the trained classifier can be configured to process the untagged sensor data. In some examples, the rule-based classifier can be programmed to process the tagged sensor data as well as the untagged sensor data. The tagged sensor data can include a data tag identifying a type of data of the tagged sensor data. In some examples, the data tag can be in a given language (e.g., Ukrainian).

The rule-based classifier can be programmed to identify a first normalized data tag for the tagged sensor data based on a pre-defined tag rule-set. The pre-defined tag rule-set can include at least one rule that identifies an associated data tag for corresponding sensor data. The rule-based classifier can be programmed to update the tagged sensor data to include the first normalized data tag to provide a standardized data label for the tagged sensor data. In some examples, the first normalized data tag can be in another language (e.g., English). The trained classifier can include a machine-learning (ML) model. The ML model can be programmed to classify the untagged sensor data and/or the tagged sensor data to identify a given class associated with a second normalized data tag. The trained classifier can be programmed to update the untagged sensor data with the second normalized data tag based on the classification by the ML model to provide the standardized data label for the untagged and/or tagged sensor data. The first and second normalized data tags can be one of similar and different normalized data tags.

FIG. 1 illustrates an example environment 100 for classifying sensor data from a power generation site 102. In some examples, the power generation site 102 includes a plurality of power generation sites 104-110. Each of the power generation sites 104-110 can be configured to provide (e.g., generate) electrical power. In other examples, the power generator site 102 can include less than all of the plurality of power generation sites 104-110, as illustrated in the example environment 100. By way of example, a first power generation site 104 can include a power plant 112. The power plant 112 can be configured to provide three-phase power on a corresponding transmission line to another site, such as a power distribution site. Users (e.g., consumers, businesses, etc.) can be coupled to the power distribution site to receive a given amount of power to meet electrical needs. Although FIG. 1 illustrates a single power plant, in other examples, the first power generation site 104 can be representative of a plurality of plants, each of which that can be configured to provide a given amount of three-phase power to meet power demand requirements.

In some examples, a second power generation site 106 includes a wind-turbine 114. The wind-turbine 114 can be configured to provide power (e.g., the three-phase power) by converting the wind's kinetic energy into electrical energy. In some examples, the wind-turbine 114 can be representative of a plurality of wind-turbines. Each of the wind-turbines can be manufactured by a similar or different manufacturer. By way of further examples, at least some of the wind-turbines can define (e.g., form) a wind farm (e.g., wind park). In other examples, respective subsets of the plurality of wind-turbines can define corresponding wind farms. In some examples, a third power generation site 108 can include a photovoltaic (PV) array system 116. The PV array system 116 can be configured to provide power by means of photovoltaics. In some examples, the PV array system 116 can be representative of a PV power station (e.g., a solar park or a solar farm). Thus, the PV array system 116 can correspond to a plurality of PV array system 116, in some instances.

In some examples, a fourth power generation site can include a power generation system 118. The power generation system 118 can be representative of any power generating source. In other examples, the power generation system 118 can be representative of a plurality of power generating sources. For example, the power generation system 118 can include an energy generator. As an example, the energy generator is renewable energy generator, such as a PV array, a wind turbine, a hydroelectric generator, etc. In other examples, the energy generator can be implemented as a fossil fuel generator, such as a diesel or gasoline generator. In further examples, the power generation system 118 can include a power plant, such as a wind farm, a solar system, a thermal solar field, a fossil fuel based power generator (e.g., a coal or natural gas power generator) and/or a nuclear power generator and attendant constituent structures or any combination thereof. Alternatively, the power generation system 118 could be implemented as a stored power system (e.g., a battery system).

Each of the power generation sites 104-110 can employ one or more sensors 120-126 (labeled in FIG. 1 as "SENSOR(S)"). Each power generation site 104-110 can include at least one respective sensor 120-126 to monitor (e.g., detect, record, measure, etc.) a physical property or condition of an associated power generating source, such as the power plant 112, the wind-turbine 114, the PV array system 116, and the power generation system 118. The at least one respective sensor 120-126 can be positioned relative to a power generating source, such that the at least one respective sensor 120-126 can be enabled to monitor the physical property or condition associated with the power generating source. The at least one respective sensor 120-126 can include any type of sensor that can be used to monitor and provide measurements corresponding to sensor values to characterize the physical property or condition that is being monitored. The sensor values can include analog or digital values. In some examples, the at least one respective sensor 120-126 can be provide sensor a signal, such as analog sensor signal or a digital sensor signal. The sensor signal over time can have a given shape corresponding to a waveform of the sensor signal.

As an example, the at least one sensor 120 associated with the power plant 112 can include condition monitoring sensors, temperature sensors, air temperature sensors, air flow sensors, etc. The at least one sensor 122 associated with the wind-turbine 114 can include a blade position sensor, a blade pressure sensor, a bearing temperature sensor, a gearbox accelerometer, a fluid pressure sensor, a fluid level sensor, a turbine shroud sensor, a winding temperature sensor, a wind speed sensor, a wind speed direction sensor, a stator temperature sensor, a tower sway sensor, a tower positioning sensor, etc. The at least one sensor 124 associated with the PV array system 116 can include a voltage sensor, an irradiance sensor, a back-of-PV temperature sensor, an ambient air temperature sensor, a wind speed sensor, a wind speed direction sensor, a relative humidity sensor, a rain gauge sensor, a barometric pressure sensor, a power output sensor, a voltage output sensor, etc. By way of further example, the at least sensor 126 associated with the power generation system 118 can include any sensor that may be needed to measure a corresponding physical property or condition of the power generation system 118. In some examples, the power generation system 118 can include any of the sensors, as described herein with respect to the power plant 112, the wind-turbine 114 and the PV array system 116. In additional or alternative examples, the at least one sensor 120-126 associated with a given power generating source can be used at another power generating source.

Each of the sensors 120-126 can be configured to provide sensor data. In some examples, the sensor data can include a data tag identifying a type of sensor data. The sensor data can include a data tag field that can include the data tag that identifies the type of sensor data and a data value field that can include at least one sensor value characterizing the physical property or condition. In some examples, each of the sensors 120-126 employed at a corresponding site 104-110 can be produced by a different sensor manufacturer. In these examples, a subset of sensors (e.g., at least one sensor) at a given site 104-110 can be from a given manufacturer and another subset of sensors (e.g., at least one different sensor) at the given site 104-110 can be from another manufacturer. For example, a wind speed sensor for monitoring a wind speed at the second site 106 can be provided by the given manufacturer and another wind speed sensor at the second site 106 can be provided by the other manufacturer.

In some examples, the subset of sensors can be configured to provide sensor data having the data tag and the other subset of sensors can be configured to provide sensor data without the data tag. For example, the subset of sensors can be produced (e.g., designed) by the given manufacturer to provide the sensor data with the data tag and the other subset of sensors can be produced by the other manufacturer to provide the sensor data without the tag data. In some examples, the other subset of sensors can be manufactured by the other manufacturer to provide the sensor data with the data tag in a given language. For example, the tag data of the sensor data provided by the other subset of sensors can be in a language other than English, such as Ukrainian, Spanish, Mandarin, etc. As described herein, the tag data in the given language can be normalized to provide a standardized data label for the sensor data to enable a user readily understand the type of sensor data. The normalization can include identifying a normalized data tag in another language that is understandable by the user, thereby enabling the user to understand the meaning of the tag data in the given language.

By way of further example, each sensor 120-126 can be associated with a data logger 128. In some examples, the data logger 128 can be implemented on a dedicated device. In these examples, the dedicated device can include one or more processors and a memory (e.g., a non-transitory memory). The one or more processors can access the memory and execute the machine readable instructions therein to implement one or more functions of the data logger 128, as described herein. In other examples, the data logger 128 can be representative of machine readable instructions that can be executed on a computing platform, such as one or more servers. The computing platform can include a combination of hardware (e.g., memory and one or more processors) and software for implementing the one or more functions of the data logger 128.

In some examples, each site 104-110 includes a plurality of data loggers 128 and each data logger 128 can be in communication with one or more respective sensors 120-126 at each site 104-110. Each data logger 128 can be configured to receive the sensor data from each sensor 120-126. Different data collectors can employ different communication protocols for receiving corresponding sensor data. In some examples, each data logger 128 at each site 104-110 can be configured to compress collected sensor data to provide compressed sensor data. The compressed sensor data at each site 104-110 can be communicated to an associated power site server 130. In other examples, the compressed sensor data from each site 104-110 can be communicated to a sensor data mapper 132. Thus, in these examples, each data logger 128 can be in communication with the sensor data mapper 132.

In some examples, a subset of data loggers 128 (e.g., at least one data logger) at each site 104-110 can be configured to record changes in sensor values over time based on respective sensor data received over a period of time from each sensor 120-126. Thus, the subset of data loggers 128 can be configured to record variations in the sensors values over the period of time between respective sets of sensor data provided by each sensor 120-126. For example, if the subset of data loggers 128 receives a sensor value within the sensor data from each sensor 120-126 over the period of time (e.g., over a course of an hour), and the sensor value remains constant between respective sets of sensor data, the subset of data loggers 128 can be configured to record one value for the period of time. As such, changes in data values (e.g., sensor values) can be recorded for each sensor 120-126 during the period of time. The data logger 128 can be configured to generate and provided compressed sensor data for the period of time having at least one record sensor value and, in some examples, the data tag for that sensor 120-126. By recording a single sensor value can reduce an amount of information that is provided to the sensor data mapper 132, such that multiple instances of similar sensor data are not transmitted to the sensor data mapper 132. In some examples, the data logger 128 can be configured to omit compression of the sensor data.

Continuing with the example of FIG. 1, each site 104-110 includes a power site server 130. In some examples, a subset of the sites 104-110 includes the power site server 130. Each power site server 130 can be in communication with the sensor data mapper 132. The power site server 130 for the subset of sites 104-110, in some examples, can be implemented as a supervisory control and data acquisition (SCADA) server. As an example, the SCADA server can be configured operate at a respective command center, such as for a respective site 104-110. In still other examples, the power site server 130 can be representative of a combination of a third party server and a SCADA system operating in concert. The power site server 130 and/or the sensor data mapper 132 can be implemented as a computing platform, such as one or more servers that execute application software on top of an operating system. That is, the power site server 130 and/or the sensor data mapper 132 can be implemented as a combination of hardware (e.g., memory and one or more processors) and software. Thus, components of the power site server 130 and/or the sensor data mapper 132 can be representative of machine readable instructions stored in a non-transitory memory and one or more processors that access the memory and execute the machine readable instructions. In such a situation, the non-transitory memory can be implemented as volatile memory (e.g., random access memory) and/or non-volatile memory (e.g., a solid state drive, a hard disk drive, flash memory, etc.).

Further, the power site server 130 and/or the sensor data mapper 132 could be implemented on a computing cloud. In such a situation, features of the power site server 130 and/or the sensor data mapper 132, such as a processing unit (e.g., a processor 134), a network interface, and a memory (e.g., a memory 136) could be representative of a single instance of hardware or multiple instances of hardware with applications executing across the multiple of instances (e.g., distributed) of hardware (e.g., computers, routers, memory, processors, or a combination thereof). Alternatively, the power site server 130 and/or the sensor data mapper 132 could be implemented on a single dedicated server.

In some examples, the data logger 128 and/or the power site server 130 can be configured to aggregate sensor data from respective sensors 120-126 at each site 104-110 to provide aggregated sensor data. The aggregated sensor data can be communicated to the sensor data mapper 132 for processing and classification, as described herein. The sensor data mapper 132 can be configured to receive the sensor data provided by corresponding sensors 120-126. The sensor data at the sensor data mapper 132 can include the compressed sensor data, the aggregated sensor data and/or a stream of sensor data that can be provided continuously by the data logger 128 and/or the power site server 130 to the sensor data mapper 132. As described herein, the sensor data mapper 132 can be configured to update sensor data with a respective normalized data tag to standardize the sensor data to provide a standardized data label for received sensor data.

In some examples, the processor 134 of the sensor data mapper 132 can be configured to process the sensor data based on machine-readable instructions stored in the memory 136 of the sensor data mapper 132. In some examples, the memory 136 can correspond to a memory type, as described herein. The machine-readable instructions can include a rule-based classifier 138 and a trained classifier 140. The sensor data mapper 132 can be configured to provide sensor data to one of the rule-based classifier 138 and the trained classifier 140. In some examples, the sensor data can include an identifier (e.g., the data tag) for the at least one sensor value of the received sensor data. In these examples, the sensor data having the data tag can be referred as "tagged sensor data." In other examples, the sensor data does not include the identifier for the at least one sensor value of the received sensor data. In these examples, the sensor data without the data tag can be referred as "untagged sensor data." The sensor data mapper 132 can be configured to provide tagged and untagged sensor data to one of the rule-based classifier 138 and the trained classifier 140 for normalization corresponding to updating the tagged and/or untagged sensor data with a normalized data tag. Accordingly, the normalized data tag can provide a standardized data label for the at least one sensor value of the sensor data received at the sensor data mapper 132.

By way of further example, the sensor data mapper 132 can be configured to evaluate a pre-defined tag rule set of the rule-based classifier 138 to determine whether the rule-based classifier 138 includes a data tag rule for normalizing the data tag of the tagged sensor data. The sensor data mapper 132 can be configured to provide the tagged sensor data to the rule-based classifier 138 in response to determining that the rule-based classifier 138 can process and normalize the tagged sensor data. In additional or alternative examples, the sensor data mapper 132 can be configured to provide the tagged sensor data to the trained classifier 140 for classification of the tagged sensor data and updating of the tag data of the tagged sensor data to the normalized data tag. In some examples, the sensor data mapper 132 can be configured to provide the untagged sensor data to the trained classifier 140 for processing and normalization corresponding to identifying the normalized data tag for the untagged sensor data.

The rule-based classifier 138 can include the pre-defined tag rule set for processing the tagged sensor data. For example, each data tag rule of the pre-defined tag rule set can identify a given data tag for corresponding sensor data. The pre-defined tag rule set can further identify the normalized data tag for each identified given data tag. The rule-based classifier 138 can be programmed to process the tagged sensor data to identify the normalized data tag for the sensor data based on the pre-defined tag rule set. Thus, the rule-based classifier 138 can be programmed to standardize the data label for the at least one sensor value of the tagged sensor data.

As an example, if the data tag of the tagged sensor data is representative of a "WndSpd" label the rule-based classifier 138 can be programmed to replace the data tag with the normalized data tag that is representative of a "WindSpeed" label to provide the standardized label for the at least one sensor value of the tagged sensor data. Accordingly, the rule-based classifier 138 can be programmed to update the tagged sensor data by replacing (e.g., renaming) the data tag field that includes the data tag of the tagged sensor data. The tagged sensor data updated with the normalized data tag can be referred to herein as "normalized sensor data."

In some examples, the trained classifier 140 can be programmed to receive the tagged sensor data and classify the tagged sensor data to identify a given class of a plurality of different classes. Each class of the plurality of different classes can be associated with a corresponding normalized data tag. For example, a given class (e.g., "Wind_Speed") can be associated with a respective normalized data tag (e.g., "WindSpeed") and another class (e.g., "Ambient_Temperature") can be associated with a different normalized data tag (e.g., "AmbientTemperature").

The trained classifier 140 can include a machine-learning (ML) model that has been trained based on tag sensor training data for classifying the tagged sensor data into a respective class of the plurality of different classes. Thus, the ML model can be referred to herein as a "data tag classifier." Example data tag classifiers (e.g., classification algorithms) can include decision tree classifiers, Naïve Bayes classifiers, artificial neural network classifiers (e.g., a convolutional neural network), recurrent neural networks (e.g., long short-term memory networks), and k-Nearest Neighbor classifiers. In other examples, a different data tag classifier can be employed. By way of example, the tag sensor training data can characterize at least one of a plurality of different data tags for respective sensor data and an associated normalized data tag for the respective sensor data, a numeric range for at least one sensor value characterized by the respective sensor data and the associated normalized data tag, a seasonality of the respective sensor data and the associated normalized data tag, and/or a waveform of an associated sensor signal provided by a corresponding sensor and the associated normalized data tag for the waveform. In additional or alternative examples, the tag sensor training data can characterize topology factors and environmental factors for each sensor that provides corresponding sensor data.

The trained classifier 140 can be programmed to employ the data tag classifier to process the tagged sensor data to identify the given class associated with the normalized data tag. Thus, the trained classifier 140 can be programmed to standardize the data label for the at least one sensor value of the tagged sensor data. By way of example, if the data tag of the tagged sensor data is representative of the "WndSpd" label, the trained classifier 140 can be programmed to replace the data tag with the normalized data tag that is representative of the "WindSpeed" label to provide the standardized label for the at least one sensor value of the tagged sensor data. Accordingly, the trained classifier 140 can be programmed to update the tagged sensor data by replacing (e.g., renaming) the data tag field that includes the data tag of the tagged sensor data to provide the normalized sensor data.

In some examples, the trained classifier 140 can be programmed to include a portion of the data tag in the normalized sensor data in response to identifying the normalized data tag. For example, the trained classifier 140 can be programmed to deconstruct the data tag of the tagged sensor data into a plurality of data tag fields. The trained classifier 140 can be programmed to update the identified normalized data tag to include at least one data tag field of the plurality of data tag fields. The trained classifier 140 can be programmed to update the tagged sensor data with the updated identified normalized data tag to normalize the tagged sensor data to provide the standardized data label for the tagged sensor data. Thus, in some examples, the normalized sensor data can include the updated normalized data tag having a portion of the data tag of the tagged sensor data.

By way of example, if the data tag of the tagged sensor data is representative of a "WBS1_001_WSpeed" label, the trained classifier 140 can be programmed to deconstruct the tagged sensor data into "WBS1", "001" and "WSpeed." In this example, if the normalized data tag is representative of the "Wind_Speed" label, the trained classifier 140 can be programmed to modify the normalized data tag to include "WBS1" and "001," to provide an updated normalized data tag that is representative of "WBS1-0001.Wind_Speed." The trained classifier 140 can be programmed to update the tagged sensor data with the updated identified normalized data tag corresponding to "WBS1-0001.Wind_Speed" to provide the normalized sensor data. Thus, each sensor value of the tagged sensor data can be associated with the normalized data tag.

In some examples, the trained classifier 140 can be programmed to receive untagged sensor data corresponding to sensor data that does not have a data tag for at least one sensor value of the sensor data. In these examples, the trained classifier 140 can be programmed to employ the data tag classifier to process the untagged sensor data to identify the given class associated with the normalized data tag. For example, the data tag classifier can be programmed to evaluate the at least one sensor value relative to each numeric range to identify a corresponding numeric range associated with given class. In other examples, the untagged sensor data can include a plurality of sensor values corresponding to (e.g., representative) of a sensor signal (e.g., an analog and/or digital signal). The data tag classifier can be programmed to evaluate a waveform of the sensor signal relative to each waveform to identify a corresponding waveform associated with the given class.

The trained classifier 140 can be programmed to update the untagged sensor data with the normalized data tag to provide the normalized sensor data. For example, the trained classifier 140 can be programmed to embed the normalized data tag in the data tag field of the untagged sensor data. By way of example, if the normalized data tag is representative of the "WindSpeed" label the trained classifier 140 can be programmed to update the untagged sensor data to include the "WindSpeed" label to provide the standardized data label for the untagged sensor data, thereby transforming the untagged sensor data to the normalized sensor data.

In even further examples, the tagged sensor data can include the data tag in a given language. The given language, in some examples, can be a non-Latin language. For example, the given language can be a language other than English. The trained classifier 140 can be programmed to employ the data tag classifier to identify the given class of the plurality of different classes that is associated with the normalized data tag. In these examples, the normalized data tag can be in another language that is different than the given language. The data tag classifier can be trained based on the tag sensor training data characterizing a plurality of different data tags of respective sensor data that is in a respective language and a corresponding normalized data tag that is in a different language that is understandable by a user. As an example, if the data tag of the tagged sensor data is in Ukrainian and corresponds to a Ukrainian wind speed data tag, such as "швидкість вітру,," the trained classifier 140 can be programmed to employ the data tag classifier that has been trained to classify Ukrainian tags to identify the given class of the plurality of different classes that is associated with the normalized data tag for the Ukrainian wind speed label. The trained classifier 140 can be programmed to update the tagged sensor data and replace the Ukrainian wind speed data tag with the normalized data tag that is in another language, such as English. Thus, trained classifier 140 can be programmed to transform the data tag of the tagged sensor from the given language to the other language to provide the normalized sensor data. The normalized sensor data can be provided by the sensor data mapper 132 to a graphical user interface (not shown in FIG. 1). The graphical user interface can be configured to render the normalized sensor data on a display (not shown in FIG. 1). The user (e.g., personnel) can employ the rendered normalized sensor data to evaluate the physical property or condition of a power generating source, such as the power plant 112, the wind-turbine 114, the PV array system 116, and the power generation system 118.

Accordingly, by employing the sensor data mapper 132, sensor data from each sensor 120-126 can be normalized to provide a standardized data label, such that the user can easily track and determine (e.g., identify) which sensor provided the sensor data. Moreover, by employing the sensor data mapper 132 during a start-up phase of a new power generation site can help or reduce an amount of time need for on-boarding the new power generation site. The sensor data mapper 132 can reduce and improve on-boarding of new power generation sites by automatically identifying and assigning a normalized data tag for sensor data from new power generation site.

Figure 2:
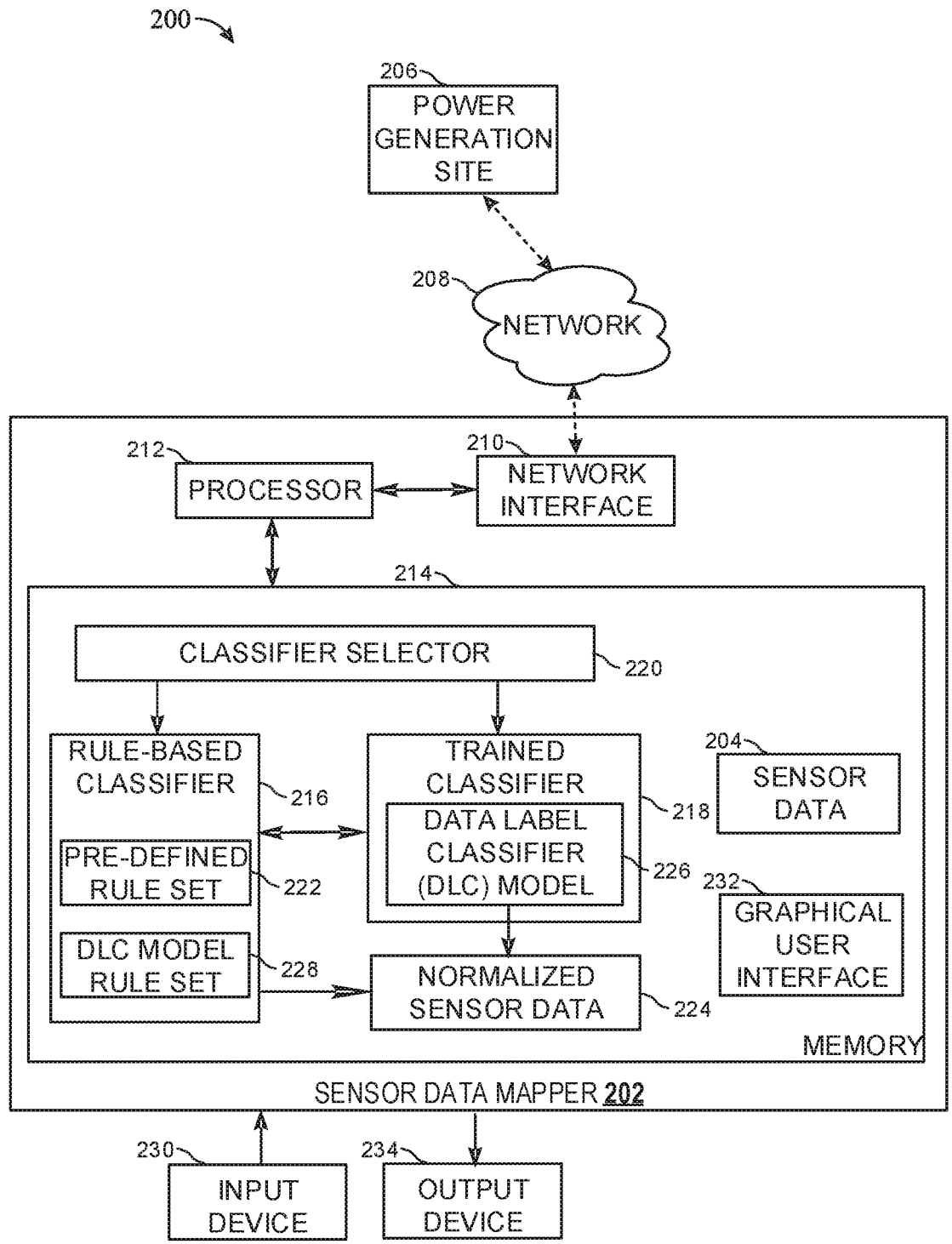
FIG. 2 illustrates an example of a sensor data mapper.

FIG. 2 illustrates an example of a sensor data mapper 202 for classifying sensor data 204 provided at a power generation site 206. The sensor data mapper 202 can correspond to the sensor data mapper 132, as illustrated in FIG. 1. In some examples, the power generation site 206 corresponds to the power generation site 102, as illustrated in FIG. 1. Thus, the power generation site 206 can correspond to at least one of the power generation sites 104-110, as illustrated in FIG. 1. Each power generation site 206 can employ one or more sensors that can be configured to provide the sensor data 204. Thus in some examples, the sensor data 204 can include multiple instances of sensor data from each sensor employed at each power generation site 206. The one or more sensors can include at least one of the sensors 120-126, as illustrated in FIG. 1.

In some examples, the sensor data 204 can include a first set of sensor data and a second set of sensor data. As an example, the first and second sets of sensors data can be exclusionary or non-intersecting and can have no common members. Thus, in some instances, the first set of sensor data can be provided by a given sensor at the power generation site 206 and the second set of sensor data can be provided by another sensor at the power generation site 206. In additional or alternative examples, the first or the second sets of sensor data can include no members (e.g., have no sensor data). The sensor data 204 can include a data tag identifying a type of sensor data and at least one sensor value (e.g., providing by a given sensor). In some examples, the sensor data 204 can include a data tag field that can include the data tag and a data value field that can include the at least one sensor value. In additional or alternative examples, the sensor data 204 does not include the data tag field. In some examples, the first set of sensor data can correspond to untagged sensor data and the second set of sensor data can correspond to tagged sensor data.

Each power generation site 106 can employ a server (e.g., a power site server, such as the power site server 130, as illustrated in FIG. 1). The server can be in communication with the sensor data mapper 202 via a network 208. The network 208 can included a wired network, a wireless network, and a combination thereof. To receive the sensor data 204, the sensor data mapper includes a network interface 210. The network interface 210 can be configured to receive the sensor data and provide the sensor data to a processor 212 for storage in a memory 214 of the sensor data mapper 202. The sensor data mapper 202 can be implemented on one or more physical devices (e.g., servers) that can reside in a cloud computing environment, a mobile device, or on a computer, such as a laptop computer, a desktop computer, a tablet computer, a workstation, or the like. In the present example, although the components of the sensor data mapper 202 are illustrated as being implemented on a same system, in other examples, the different components could be distributed across different systems and communicate, for example, over the network 208. The memory 214 can be representative of a non-volatile data storage, such as a hard disk drive, a solid-state drive, flash memory, etc. In some examples, the memory 214 can include a single discrete article or multiple articles interconnected to allow for data transfer among them, for example, via an associated bus or a local or wide-area network connection.

The processor 212 can be configured to process the sensor data 204 based on machine-readable instructions stored in the memory 214. The machine-readable instructions can include a rule-based classifier 216 and a trained classifier 218. In some examples, the rule-based classifier 216 corresponds to the rule-based classifier 138, as illustrated in FIG. 1 and the trained classifier 218 corresponds to the trained classifier 140, as illustrated in FIG. 1. The machine-readable instructions can further include a classifier selector 220. The classifier selector 220 can be programmed to determine which of one of the rule-based classifier 216 and the trained classifier 218 to provide the sensor data 204 for sensor data normalization. The normalization of the sensor data 204 can correspond to updating the tagged and/or untagged sensor data with a normalized data tag. The normalized data tag can provide a standardized data label for the at least one sensor value of the sensor data 204.

In some examples, the classifier selector 220 can be programmed to evaluate a pre-defined tag rule set 222 of the rule-based classifier 216 to identify a data tag rule for normalizing the data tag of the sensor data 204. The classifier selector 220 can be programmed to provide the sensor data 204 to the rule-based classifier 138 in response to determining that the rule-based classifier 216 can process and normalize the tagged sensor data (e.g., in response to identifying the data tag rule). In some examples, the classifier selector 220 can be programmed to provide the tagged sensor data to the trained classifier 218 in response to determining that the rule-based classifier 216 cannot process and normalized the tagged sensor data (e.g., in response to not identifying the data tag rule).

In some examples, the classifier selector 220 can be omitted, and the sensor data 204 can be provided to the rule-base classifier 216. The rule-based classifier 216 can be programmed to process the sensor data 204 to identify the normalized data tag for the sensor data 204 based on the pre-defined rule set 222. In some examples, the rule-based classifier 216 may not identify the normalized data tag for the sensor data 204. In these examples, the sensor data mapper 202 can be configured to provide the sensor data 204 to the trained classifier 218 for classification and identification of the normalized data tag in response to rule-based classifier 216 not recognizing the normalized data tag for the sensor data based on the pre-defined rule set 222. The pre-defined rule set 222 can include at least one tag rule that identifies a normalized data for a given data tag. For example, if the data tag of the sensor data 204 is representative of a "WndSpd" label for the at least one sensor value of the sensor data 204, the rule-based classifier 216 can be programmed to replace the data tag with the normalized data tag that is representative of a "WindSpeed" label to provide a standardized label for the at least one sensor value. The rule-based classifier 216 can be programmed to update the sensor data 204 by replacing (e.g., renaming) the data tag field that includes the data tag of the sensor data 204 to provide normalized sensor data 224. Accordingly, the rule-based classifier 216 can be programmed to standardize the data label for the at least one sensor value of the sensor data 204.

In some examples, the pre-defined rule set 222 includes one or more normalization parameters. The one or more normalization parameters can include a unit of measure parameter and a scaling factor parameter. The rule-based classifier 216 can be programmed to employ the unit of measure parameter to normalize a unit of measurement for the at least one sensor value of the sensor data 204. By way of example, if the unit of measurement for the at least one sensor value is in "feet per second," the rule-based classifier 216 can be programmed to update (e.g., convert) the unit of measurement based on the unit of measure parameter to an updated unit of measurement, such as "meters per second," thereby normalizing the unit of measurement for the at least one sensor value of the sensor data 204. In some examples, the rule-based classifier 216 can be programmed to normalize the at least one sensor value of the sensor data 204 based on the scaling factor parameter. As an example, if the at least one sensor value is a first value (e.g., 30), the rule-based classifier 216 can be programmed to scale the at least one sensor value to a second value (e.g., 3) based on the scaling factor parameter, thereby normalize the at least one sensor value of the sensor data 204.

In additional or alternative examples, the classifier selector 220 can be programmed to provide the sensor data 204 to the trained classifier 218, for example, based on an evaluation of the pre-defined rule set 222 of the rule-based classifier 216. The trained classifier 218 can be programmed to receive the sensor data 204 and classify the sensor data 204 to identify a given class of a plurality of different classes. Each class of the plurality of different classes can be associated with a corresponding normalized data tag. The trained classifier 218 can include a data label classifier (DLC) model 226. The DLC model 226 can be trained on previously received training data corresponding to tag sensor training data for classifying the sensor data 204 into a respective class of the plurality of different classes. By way of example, the tag sensor training data can characterize at least one of a plurality of different data tags for respective sensor data and an associated normalized data tag for the respective sensor data, a numeric range for at least one sensor value characterized by the respective sensor data and the associated normalized data tag, a seasonality of the respective sensor data and the associated normalized data tag, and/or a waveform of an associated sensor signal provided by a corresponding sensor and the associated normalized data tag for the waveform. In additional or alternative examples, the tag sensor training data can characterize topology factors and environmental factors for each sensor that provides corresponding sensor data.

The DLC model 226 can be programmed to process the sensor data 204 to identify the given class associated with the normalized data tag. The normalized data tag can be associated with the given class. In response to identifying the given class (e.g., the normalized data tag), the trained classifier 218 can be programmed to standardize the data label for the at least one sensor value of the sensor data 204. The trained classifier 218 can be programmed to update the sensor data 204 by replacing (e.g., renaming) the data tag field that includes the data tag of the sensor data 204 to provide the normalized sensor data 224. By way of example, if the data tag of the sensor data 204 is representative of the "WndSpd" label, the trained classifier 218 can be programmed to replace the data tag with the normalized data tag that is representative of the "WindSpeed" label associated with the given class to provide the standardized label for the at least one sensor value of the sensor data 204.

In some examples, the rule-based classifier 216 or the trained classifier 218 can be programmed to include a portion of the data tag in the normalized sensor data 224 in response to identifying the normalized data tag. The rule-based classifier 216 or the trained classifier 218 can be programmed to update the sensor data 204 with the updated identified normalized data tag to provide the normalized sensor data 224. For example, the rule-based classifier 216 or the trained classifier 218 can be programmed to deconstruct the data tag of the sensor data 204 into a plurality of data tag fields. The rule-based classifier 216 or the trained classifier 218 can be programmed to update the identified normalized data tag to include at least one data tag field of the plurality of data tag fields.

As an example, the rule-based classifier 216 or the trained classifier 218 can be programmed to employ a least significant text of the plurality of data tag fields. The least significant text can include at least one letter and/or number character. Thus, if the data tag of the sensor data 204 is representative of a "WBS1_001_WSpeed" label, the "WBS1" can correspond to the least significant text. In other examples, the least significant text can include "WBS1" and "001." To identify the least significant text, the rule-based classifier 216 or the trained classifier 218 can be programmed evaluate the data tag of the sensor data 204 to identify each non-letter and/or non-number character referred to herein as a "special character." By way of example, the special character can include an underscore "_", a hyphen "-", a period ".", etc. In other examples, a different special character can be used. The rule-based classifier 216 or the trained classifier 218 can be programmed to evaluate the data tag of the sensor data 204 to identify the special characters and one or more texts neighboring a respective special character or between a set of special characters. Thus, the rule-based classifier 216 or the trained classifier 218 can be programmed to deconstruct the data tag of the sensor data 204 into a plurality of data tag fields corresponding to the identified texts.

By way of further example, if the data tag of the sensor data 204 is representative of the "WBS1_001_WSpeed" label, the rule-based classifier 216 or the trained classifier 218 can be programmed to deconstruct the tagged sensor data into "WBS1", "001" and "WSpeed." In this example, if the normalized data tag is representative of "Wind_Speed," the rule-based classifier 216 or the trained classifier 218 can be programmed to modify the normalized data tag to include at least two significant texts corresponding to "WBS1" and "001," to provide an updated normalized data tag that is representative of the "WBS1-0001.Wind_Speed" label. In these examples, the rule-based classifier 216 or the trained classifier 218 can be programmed to update the sensor data 204 with the updated identified normalized data tag corresponding to the "WBS1-0001.Wind_Speed" label to provide the normalized sensor data 224.

In some examples, the trained classifier 218 can be programmed to receive sensor data 204 without the data tag for the at least one sensor value of the sensor data 204. The DLC model 226 can be programmed to process the sensor data 204 without the data tag to identify the given class associated with the normalized data tag, and thus a standardized data label for the unlabeled sensor data. The DLC model 226 can be programmed to evaluate the at least one sensor value of the sensor data 204 relative to each numeric range to identify a corresponding numeric range associated with given class. In some examples, the sensor data 204 can include a plurality of sensor values corresponding to (e.g., representative) of a sensor signal (e.g., an analog and/or digital sensor signal).

The DLC model 226 can be programmed to evaluate a waveform of the sensor signal relative to each waveform to identify a corresponding waveform associated with the given class. The trained classifier 218 can be programmed to update the sensor data 204 with the normalized data tag to provide the standardized data label for each sensor value of the sensor data 204. For example, the trained classifier 218 can be programmed to insert (e.g., embed) the normalized data tag in the data tag field of the sensor data 204. As an example, if the normalized data tag is representative of the "WindSpeed" label, the trained classifier 218 can be programmed to update the sensor data 204 to include the "WindSpeed" label to provide the standardized data label for the untagged sensor data, thereby transforming the sensor data 204 to the normalized sensor data 224.

In some examples, the DLC model 226 can be programmed to classify the sensor data 204 by evaluating sensor values of the sensors data 204 relative to a sensor value range. In these examples, the DLC model 226 can be trained based on a plurality of different sensor value ranges. Each of the different sensor value ranges can be associated with a respective normalized data tag. The DLC model 226 can be programmed to identify the given class associated with a corresponding sensor value range by evaluating at least one sensor value of the sensor data 204 relative to each of the plurality of different sensor value ranges. By way of example, if the sensor data 204 includes at least one sensor value characterizing a measured temperature, the DLC model 226 can be programmed to evaluate the at least one sensor value relative to each of the plurality of different sensor value ranges to identify the normalized data tag for the sensor data 204. In this example, a first sensor value range can characterize a wind speed value range and a second sensor value range can characterize a temperature value range. As an example, the wind speed value range can be from about 30 to about 40 and the temperature value range can be from about −5 to about 25. If the at least one sensor value is about 2, the DLC model 226 can be programmed to determine that the at least sensor value is within the temperature value range. The normalized data tag associated with the temperature value range can be employed to normalize the data tag of the sensor data 204.

In some examples, the trained classifier 218 can be programmed to communicate with the rule-based classifier 216 to update the pre-defined rule set 222 for subsequent processing and normalization of associated sensor data 204 having a similar data tag as the sensor data 204 that was normalized by the trained classifier 218. For example, the trained classifier 218 in response to identifying the normalized data tag for the at least one sensor value of the sensor data 204 can generate a DLC model rule set 228 in response to identifying the normalized data tag for the at least one sensor value of the sensor data 204. The DLC model rule set 228 can include a rule that associated the normalized data tag with the data tag of the sensor data 204. In some examples, the DLC model rule set 228 includes a rule that associated the normalized data tag with sensor identification (ID) information of the sensor data 204. Thus, in these examples, the sensor data 204 can include sensor ID information.

In some examples wherein the sensor data 204 does not include the data tag, the trained classifier 218 can be programmed to generate the DLC model rule set 228 to associate the sensor ID information with the normalized data tag. In additional or alternative examples, the trained classifier 218 can be programmed to determine a numeric sensor value range for the at least one sensor value of the sensor data 204 and provide the DLC model rule set 228 to associate the determined numeric range with the normalized data tag. The rule-based classifier 216 can be programmed to process subsequent sensor data having a similar data tag, sensor ID information, and/or sensor value numeric range as the sensor data 204 to identify the normalized data tag based on the DLC model rule set 228.

In additional or alternative instances, the data tag of the sensor data 204 is in a given language. For example, the given language can be a language other than English. The DLC model 226 can be programmed to identify the given class of the plurality of different classes that is associated with the normalized data tag. In these examples, the normalized data tag can be in another language that is different than the given language. The DLC model 226 can be trained based on the tag sensor training data characterizing a plurality of different data tags of respective sensor data that is in a respective language and a corresponding normalized data tag that is in a different language. For example, if the data tag of the sensor data 204 is in Ukrainian and corresponds to a Ukrainian wind speed data tag, such as " швидкість вітру,," the DLC model 226 that has been trained to classify Ukrainian tags can be programmed to identify the given class of the plurality of different classes that is associated with the normalized data tag for the Ukrainian wind speed label. The trained classifier 218 can be programmed to update the sensor data 204 and replace the Ukrainian wind speed data tag in the sensor data 204 with the normalized data tag that is in another language, such as English, to provide the normalized sensor data 224. Thus, the sensor data mapper 202 can be programmed to receive sensor data that has be tagged (e.g., labeled) in a first language and transform a data tag of the sensor data to a second language that is different from the first language.

By way of further example, the sensor data mapper 202 can be configured to communicate with an input device 230. The input device 230 can be any type of device capable of supporting a communications interface to the sensor data mapper 202. Exemplary input devices 230 can include a server, a mobile device, a mobile computer, a tablet, etc. In some examples, the input device 230 is a gesture device, a mouse, a keyboard, etc. The input device 230 can be connected to the sensor data mapper 202 using a provided network (e.g., via common internet protocols), such as a wired or wireless network. As an example, the provided network can correspond to the network 208, as illustrated in FIG. 1. By way of further example, the provided network can include an Internet, an intranet, a WiFi network, a WiMAX network, a mobile telephone network, and combinations thereof. The input device 230 can be configured to enable a user to interact with the sensor data mapper 202 via a local interface (e.g., a web browser, software application, etc.). For example, the user can employ the input device 230 to provide or update the pre-defined rule set 222 (e.g., to update the pre-defined rule set 222 to include one or more additional tag processing rules). In some examples, the user can manually update a data tag of sensor data to the normalized data tag and provide updated tag information to the sensor data mapper 202. The sensor data mapper 202 can be configured to generate a rule characterizing an association of the data tag of the sensor data and the normalized data tag and store the rule as part of the pre-defined rule set 222.

In some examples, the sensor data mapper 202 can be programmed to employ a graphical user interface 232. The graphical user interface 232 can be programmed to receive and process the normalized sensor data 224 to generate one or more graphical images characterizing the normalized sensor data 224 for visualization (e.g., by the user). For example, the graphical user interface 232 can be programmed to communicate with an output device 234. In some examples, the output device 234 can be part of the input device 230 while in other examples the output device 234 is separate from the input device 230. The output device 234 can include one or more displays, such as a monitor, heads up display or virtual reality headset or goggles. The output device 234 can be configured to receive the one or more graphical images and display (e.g., render) the graphical images. The user can employ (e.g., interpret) the rendered images to evaluate a physical property or condition of a power generating source at the power generation site 206. The power generating source can include a power plant (e.g., the power plant 112, as illustrated in FIG. 1), a wind-turbine (e.g., the wind-turbine 114, as illustrated in FIG. 1), a PV array system (e.g., the PV array system 116, as illustrated in FIG. 1) and/or a power generation system (e.g., the power generation system 118, as illustrated in FIG. 1).

Accordingly, by employing the sensor data mapper 202, the sensor data 204 from each sensor can be normalized to provide a standardized data label, such that the user can easily understand, track and determine which sensor provided the sensor data 204. Moreover, by using the sensor data mapper 202 during a start-up phase of a new power generation site can help or reduce an amount of time needed for on-boarding the new power generation site, such as into an on operational monitoring system. For example, a power generation site can include multiple sensors that have been produced by a different provider. Due to variations in sensor manufacturers, the sensor data from each sensor can include data tags that are not standardized (e.g., for a given power generation site) and thus may not meet a power generation site monitoring standard or make it difficult to understand a meaning of a respective data tag. In some examples, the sensor data may not have any tag at all and/or the sensor data has a data tag in a different language than the user can understand. The sensor data mapper 202 can be configured to normalize the sensor data, such that the sensor data from each sensor has a normalized data tag that can be understood by the user and reduce the on-boarding of the power generation site. Although the examples presented herein are with respect to sensor classification and labeling of power generation sensor data, the examples herein should not be construed and/or limited to only to power generation sensor site data classification. Thus, the sensor data mapper 202 (or the sensor data mapper 132) can be configured to normalize sensor data in any sensor application, including internet of things (IoT) applications, manufacturing applications, business applications, tracking applications, etc.

FIG. 3 illustrates an example of a table 300 characterizing data tag mapping. The table 300 includes a first column 302, a second column 304, and a third column 306. As illustrated in the example of FIG. 3, the first column 302 (e.g., labelled as "First Tag") specifies a plurality of different data tags for characterizing wind speed sensor values of wind speed sensor data. In some examples, the wind speed sensor data corresponds to the sensor data 204, as illustrated in FIG. 2. The second column 304 (e.g., labelled as "Second Tag") specifies a respective normalized data tag for each corresponding instance of the wind speed sensor data. As described herein, a sensor data mapper (e.g., the sensor data mapper 132, as illustrated in FIG. 1 or the sensor data mapper 202, as illustrated in FIG. 2) can be employed to normalize and thus standardize each of the plurality of different data tags in respective fields in the first column 302 to provide a standardized data label for each instance of the wind speed sensor data. Each normalized data tag in the second column 304 can be associated with a corresponding class in the third column 306. The third column (e.g., labelled as "Standardized Tag Classification") provides the corresponding class for each normalized data tag. In some examples, the corresponding class can correspond to a classification class, such as determined (e.g., identified) by a classifier (e.g., the trained classifier 140, as illustrated in FIG. 1 or the trained classifier 218, as illustrated in FIG. 2). In some examples, the sensor data mapper can be configured to provide the table 300 for visualization on a display (e.g., the output device 234, as illustrated in FIG. 2).

Figure 4:
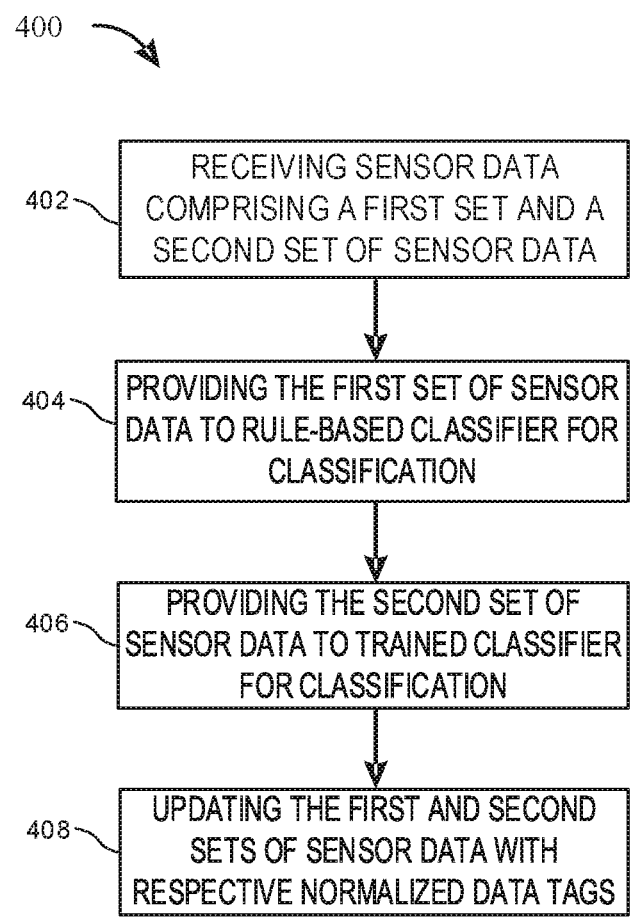
FIG. 4 illustrates a flowchart of an example method for classifying sensor data.
Figure 5:
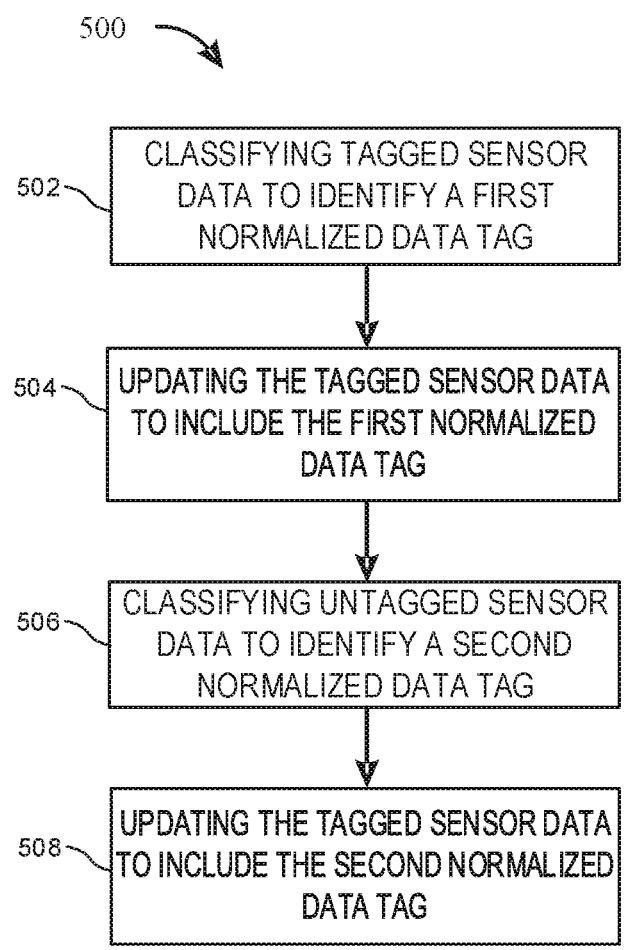
FIG. 5 illustrates a flowchart of another example method for classifying sensor data.

In view of the foregoing structural and functional features described above, example methods will be better appreciated with reference to FIGS. 4-5. While, for purposes of simplicity of explanation, the example methods of FIGS. 4-5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. Some portions of example methods of FIGS. 4-5 can be implemented as instructions stored in a non-transitory machine-readable medium. The instructions can be accessed by a processing resource (e.g., one or more processor cores, such as the processor 212, as illustrated in FIG. 2) and executed to perform the methods disclosed herein.

FIG. 4 illustrates a flowchart of an example method 400 for classifying sensor data (e.g., the sensor data 204, as illustrated in FIG. 2). The method 400 can be implemented by a sensor data mapper (e.g., the sensor data mapper 132 of FIG. 1 or the sensor data mapper 202 of FIG. 2). The method 400 can begin at 402 by receiving sensor data (e.g., the sensor data 204, as illustrated in FIG. 2) that includes a first set of sensor data and a second set of sensor data. The method 400 further includes at 404 providing the first set of sensor data to a rule-based classifier (e.g., the rule-based classifier 138, as illustrated in FIG. 1 or the rule-based classifier 216, as illustrated in FIG. 2) to identify a first normalized data tag for the first set of sensor data. The rule-based classifier can include at least one rule that identifies an associated data tag for corresponding sensor data. In some examples, the at least one rule can correspond to the pre-defined rule set 222, as illustrated in FIG. 2.

At 406, the method 400 includes providing the second set of sensor data to a trained classifier (e.g., the trained classifier 140, as illustrated in FIG. 1 or the trained classifier 218, as illustrated in FIG. 2) to identify a second normalized data tag for the second set of sensor data. The trained classifier can include a ML model (e.g., the DLC model 226, as illustrated in FIG. 2) that has been trained based on tag sensor training data for classifying the second set of sensor data into a respective class associated with the second normalized data tag. At 408, the method 400 includes updating the first and second sets of sensor data with respective first and second normalized data tags to normalize the first and second sets of sensor data to provide a standardized data label for each of the first and second sets of sensor data. In some examples, the first and second sets of sensor data that are updated with a corresponding normalized data tag at 408 can correspond to the normalized sensor data 224, as illustrated in FIG. 2.

FIG. 5 illustrates a flowchart of another example method 500 for classifying sensor data. The method 500 can be implemented by a sensor data mapper (e.g., the sensor data mapper 132 of FIG. 1 or the sensor data mapper 202 of FIG. 2). The method 500 can begin at 502 by classifying tagged sensor data to identify a first normalized data tag for tagged sensor data (e.g., the sensor data 204, as illustrated in FIG.

2) based on a pre-defined tag rule-set. The classification at 502 can be implemented by a rule-based classifier (e.g., the rule-based classifier 138, as illustrated in FIG. 1 or the rule-based classifier 216, as illustrated in FIG. 2). The tagged sensor data can include a data tag identifying a type of data of the tagged sensor data. The pre-defined tag rule-set can include at least one rule that identifies an associated data tag for corresponding sensor data. In some examples, the at least one rule can correspond to the pre-defined rule set 222, as illustrated in FIG. 2. At 504, the method 500 can include updating the tagged sensor data to include the first normalized data tag to provide a standardized data label for the tagged sensor data.

At 506, the method 500 can include classifying untagged sensor data (e.g., the sensor data 204, as illustrated in FIG. 2) to identify a given class associated with a second normalized data tag. The classification at 506 can be implemented by a trained classifier (e.g., the trained classifier 140, as illustrated in FIG. 1 or the trained classifier 218, as illustrated in FIG. 2) implementing an ML model (e.g., the DLC model 226, as illustrated in FIG. 2). Thus, the ML model can be employed to classify the untagged sensor data to identify the second normalized data tag. At 508, the method 500 can include updating the untagged sensor data with the second normalized data tag based on the classification by the ML model to provide the standardized data label for the untagged sensor data. In some examples, the first and second normalized data tags are similar data tags.

In view of the foregoing structural and functional description, those skilled in the art will appreciate that portions of the systems and methods disclosed herein may be embodied as a method, data processing system, or computer program product, such as a non-transitory computer readable medium. Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

What have been described above are examples. It is, of course, not possible to describe every conceivable combination of structures, components, or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine-readable medium having machine-readable instructions executable by a processor, the machine-readable instructions in response to being executed by the processor causing the processor to:

receive sensor data comprising a first set of sensor data a second set of sensor data, and a third set of sensor data, wherein the first set of sensor data is a first set of tagged sensor data, the second set of sensor data is a second set of tagged sensor data, and the third set of sensor data is a plurality of sets of untagged sensor data;

provide the first set of sensor data to a rule-based classifier to identify a first normalized data tag for the first set of sensor data, the rule-based classifier comprising at least one rule that identifies an associated data tag for corresponding sensor data;

apply the second set of tagged sensor data to a trained classifier to identify a second normalized data for the second set of tagged sensor data and update a respective data tag for the second set of tagged sensor data to the second normalized data tag;

provide the third set of sensor data to the trained classifier to identify a third normalized data tag for the third set of sensor data, wherein the trained classifier comprises a machine-learning (ML) model trained based on tag sensor training data for classifying the second set of tagged sensor data and the third set of sensor data into a respective class associated with the second normalized data tag or the third normalized data tag, wherein the first, second and third normalized data tags are one of similar normalized data tags and different normalized data tags, the data tag of the first set of tagged sensor data being in a given language and the third normalized data tag being in another language; and update the first, second and third sets of sensor data with respective first, second and third normalized data tags to normalize the first, second and third sets of sensor data to provide a standardized data label for each of the first, second and third sets of sensor data, wherein the first set of tagged sensor data is updated by renaming the data tag of the tagged sensor data to the first normalized data tag, and the untagged sensor data of the plurality of sets of untagged sensor data is updated by embedding the second normalized data tag in the untagged sensor data.

2. The medium of claim 1, wherein the machine-readable instructions further cause the processor to:

deconstruct the data tag of the first set of tagged sensor data into a plurality of data tag fields in response to identifying the first normalized data tag;

update the first normalized data tag to include at least one data tag field of the plurality of data tag fields; and update the first set of tagged sensor data with the updated first normalized data tag to normalize the first set of tagged sensor data to provide the standardized data label for the first set of tagged sensor data.

3. The medium of claim 1, wherein the first set of tagged sensor data and the second set of tagged sensor data are is provided by a respective sensor of a plurality of sensors employed at power generation site, the first set of tagged sensor data and the second set of tagged sensor data comprising a data tag field comprising the respective data tag that identifies a type of data of first and second sets of tagged sensor data and a data value field comprising at least one sensor value generated by the respective sensor.

4. The medium of claim 1, wherein the tag sensor training data characterizes a plurality of different data tags for respective sensor data and an associated normalized data tag for the respective sensor data, the ML model being programmed to receive the second set of tagged sensor data and classify the second set of tagged sensor data to identify the respective class associated with the second normalized data tag based on the tag sensor training data.

5. The medium of claim 4, wherein the tag sensor training data further characterizes a numeric range for at least one sensor value characterized by the respective sensor data and the associated second normalized data tag.

6. The medium of claim 5, wherein the tag sensor training data further characterizes a seasonality of the respective sensor data and the associated second normalized data tag.

7. The medium of claim 6, wherein the second set of tagged sensor data comprises a plurality of sensor values characterizing a waveform of a sensor signal generated by a corresponding sensor, the tag sensor training data further characterizing at least one waveform of an associated sensor signal and the associated second normalized data tag for the at least one waveform.

8. The medium of claim 7, wherein the tag sensor training data characterizes at least one waveform of an associated sensor signal and an associated normalized data tag for the at least one waveform, the ML model being programmed to receive the second set of tagged sensor data and classify the second set of tagged sensor data to identify the second normalized data tag for the second set of tagged sensor data based on the tag sensor training data.

9. The medium of claim 1, wherein the machine-readable instructions further cause the processor to update the rule-based classifier to include an additional rule that associates the second normalized data tag with the first set of tagged sensor data, such that subsequent received tagged sensor data having a similar data tag as the first set of tagged sensor data is tagged with the second normalized data tag that has been determined by the trained classifier logic.

10. A system comprising:
a non-transitory computer-readable medium configured to store tagged and untagged sensor data and machine-readable instructions;
a processor configured to access the non-transitory computer-readable medium and execute the machine-readable instructions, the machine-readable instructions comprising:
a rule-based classifier programmed to identify a first normalized data tag for the tagged sensor data based on a pre-defined tag rule-set, the pre-defined tag rule-set comprising at least one rule that identifies an associated data tag for corresponding sensor data, the tagged sensor data comprising a data tag identifying a type of data of the tagged sensor data, the rule-based classifier being further programmed to update the tagged sensor data to include the first normalized data tag to provide a standardized data label for the tagged sensor data; and
a trained classifier comprising a machine-learning (ML) model programmed to:
classify the untagged sensor data to identify a given class associated with a second normalized data tag;
update the untagged sensor data with the second normalized data tag based on the classification by the ML model to provide the standardized data label for the untagged sensor data, wherein the first and second normalized data tags are one of similar normalized data tags and different normalized data tags; and
receive subsequent tagged sensor data;
classify the subsequent tagged sensor data to identify the given class associated with the second normalized data tag; and
update the subsequent tagged sensor with the second normalized data tag based on the classification by the ML model to provide the standardized data label for the subsequent tagged sensor.

11. The system of claim 10, the trained classifier is further programmed to update the pre-defined tag rule-set to provide an updated tag rule-set, the updated tag rule-set comprising an additional rule that associates the second normalized data tag with the subsequent tagged sensor data, such that further received tagged sensor data having a similar data tag as the subsequent tagged sensor data is updated by the rule-based classifier with the second normalized data tag.

12. The system of claim 11, wherein the ML model has been programmed based on tag sensor training data, the tag sensor training data characterizing at least one of a plurality of different data tags for respective sensor data and an associated normalized data tag for the respective sensor data, a numeric range for at least one sensor value characterized by the respective sensor data and the associated normalized data tag, a seasonality of the respective sensor data and the associated normalized data tag, and a waveform of an associated sensor signal provided by a corresponding sensor and the associated normalized data tag for the waveform.

13. The system of claim 10, wherein the trained classifier is further programmed to:
deconstruct the data tag of the tagged sensor data into a plurality of data tag fields in response to identifying the second normalized data tag;
update the first normalized data tag to include at least one data tag field of the plurality of data tag fields; and
update the tagged sensor data with the updated first normalized data tag to normalize the tagged sensor data to provide the standardized data label for the tagged sensor data.

14. A method comprising:
receiving a first set of tagged sensor data, the first set of tagged sensor data comprising a first data tag and at least one sensor value generated by a first sensor employed at a power generation site comprising one of a power plant, a wind-turbine, and a solar panel;
receiving a second set of tagged sensor data, the second set of tagged sensor data comprising a second data tag and at least one sensor value generated by a second sensor employed at the power generation site;
classifying one of the first and second sets of tagged sensor data using a rule-based classifier to identify a first normalized data tag, the rule-based classifier comprising at least one rule that identifies an associated data tag for corresponding sensor data;
classifying using a machine-learning (ML) model a remaining set of tagged sensor data not classified by the rule-based classifier to identify a given class of a plurality of classes associated with a second normalized data tag for the remaining set of tagged sensor data, wherein the ML model is trained based on tag sensor training data, the tag sensor training data characterizing at least one of a plurality of different data tags for respective sensor data and an associated normalized data tag for the respective sensor data, a numeric range for at least one sensor value characterized by the respective sensor data and the associated normalized data tag, a seasonality of the respective sensor data and the associated normalized data tag, and at least one waveform of an associated sensor signal provided by a corresponding sensor and the associated normalized data tag for the at least one waveform;

updating the first and second data tags for each of the first and second sets of tagged sensor data to respective first and second normalized data tags to provide a standardized data label for each of the first and second sets of tagged sensor data, wherein the first and second normalized data tags are similar normalized data tags;

receiving untagged sensor data, the untagged sensor data comprising at least one sensor value generated by a third sensor employed at the power generation site;

classifying using the ML model the untagged sensor data to identify the given class of the plurality of classes associated with the second normalized data tag for the untagged sensor data; and updating the untagged sensor data to include the second normalized data tag associated with the given class to provide the standardized data label for the untagged sensor data.

\* \* \* \* \*